April 23, 1968   M. F. ZEUTSCHEL ETAL   3,379,051
MULTIPLE BEAM ULTRASONIC NONDESTRUCTIVE TESTING DEVICE
Filed Sept. 24, 1965   2 Sheets-Sheet 1
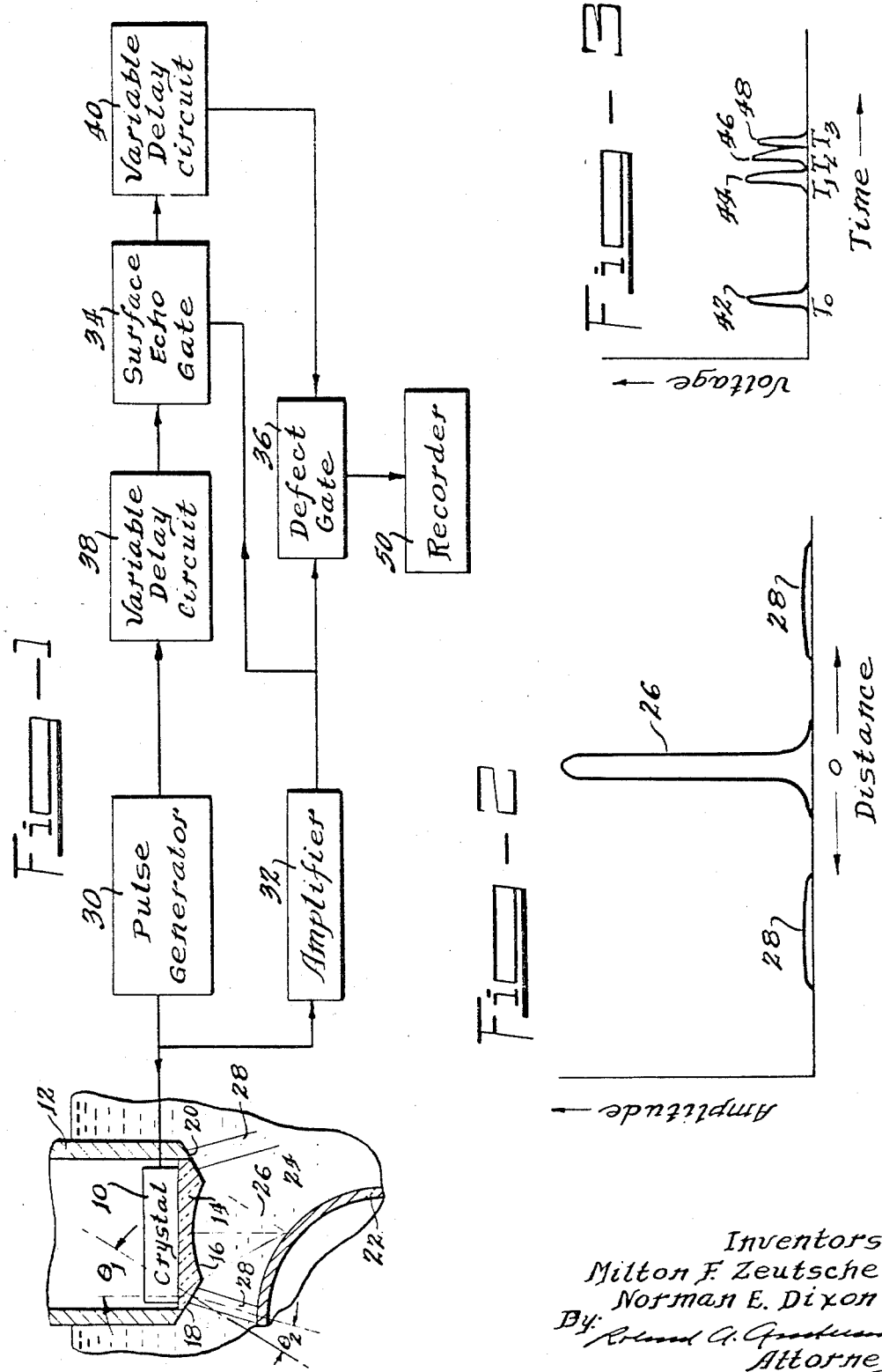
Inventors
Milton F. Zeutschel
Norman E. Dixon
Attorney

United States Patent Office 3,379,051
Patented Apr. 23, 1968

3,379,051
MULTIPLE BEAM ULTRASONIC NONDE-
STRUCTIVE TESTING DEVICE
Milton F. Zeutschel, Kennewick, and Norman E. Dixon,
Pasco, Wash., assignors to the United States of America as represented by the United States Atomic Energy
Commission
Filed Sept. 24, 1965, Ser. No. 490,143
7 Claims. (Cl. 73—67.9)

This invention relates to ultrasonic nondestructive testing and more particularly to devices using multiple ultrasonic beams to nondestructively test materials. The invention described herein was made in the course of, or under, a contract with the U.S. Atomic Energy Commission.

In order to insure high integrity or quality of materials, many manufacturing applications require ultrasonic nondestructive testing as a means for detecting defective material. When the ultrasonic test utilizes shear waves generated within the test specimen, the transmitting crystal is aligned so that ultrasonic energy transmitted therefrom strikes the specimen at an angle with respect thereto. If the surface of the specimen is rough, some of the transmitted ultrasonic energy is reflected from the surface of the specimen back to the transmitting crystal. The remaining ultrasonic energy is reflected back to the transmitting crystal by defects within the specimen. The transmitting crystal functions as a receiving element for the reflected energy.

When the specimens to be tested are very thin and the defects small, the test must be applied with great precision. With a thin specimen, the surface and defect reflected signals are received by the crystal very close together in time and in order to electronically separate them a constant crystal-to-specimen spacing must be precisely maintained. The severe mechanical requirements of such a system are not adaptable to production testing.

Accordingly, it is one object of the present invention to provide an improved ultrasonic nondestructive testing apparatus for detecting defects in thin specimens.

It is another object of the present invention to provide an ultrasonic nondestructive testing apparatus capable of detecting defects in thin specimens and which is unaffected by crystal-to-specimen spacing variations.

It is another object of the present invention to provide a multibeam ultrasonic nondestructive testing apparatus for the detection of defects in thin specimens and which is adaptable to production testing.

Other objects of the present invention will become more apparent as the detailed description proceeds.

In general, the present invention comprises a transducer crystal, a lens coupled to the crystal and a coupling material disposed between the lens and the test specimen. The lens is shaped to simultaneously generate a conical ultrasonic beam for specimen inspection and a doughnut-shaped ultrasonic beam for monitoring crystal-to-specimen spacing. Electrical means are provided responsive to the signal generated by the doughnut-shaped ultrasonic beam to record only signals from defects within the specimen.

Further understanding of the present invention may best be obtained from consideration of the accompanying drawings wherein:

FIG. 1 is a block diagram of an apparatus for the practice of the present invention.

FIG. 2 is an amplitude profile display of the beam output of the lens of FIG. 1.

FIG. 3 is an amplitude versus time display of reflections detected by the crystal of FIG. 1.

Figure 4:
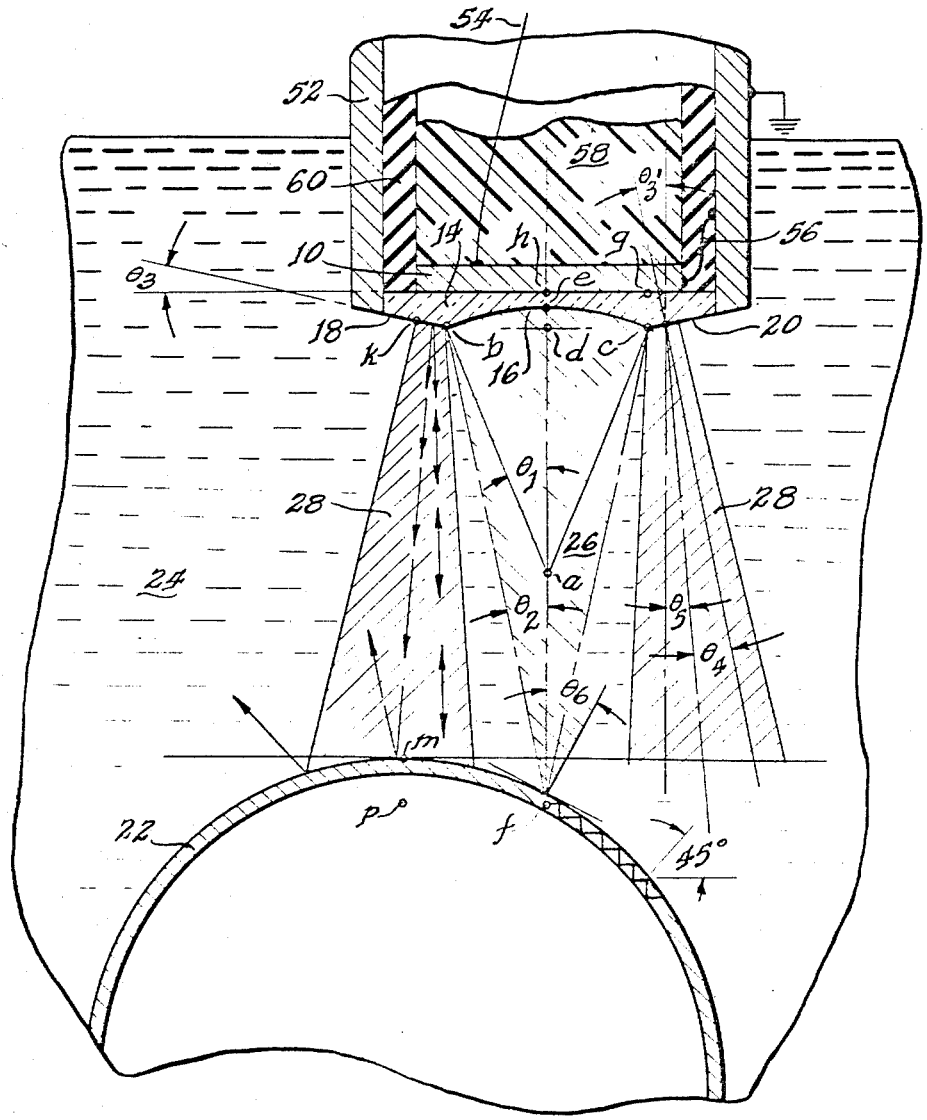
FIG. 4 is a detailed sketch of the lens-crystal combination of FIG. 1.

Reference is made to FIG. 1 wherein is shown a lens-crystal combination and associated apparatus for the practice of the present invention. A conventional piezoelectric crystal 10 is mounted in a holder 12 with a lens 14 coupled to the front side thereof. The central portion 16 of the lens 14 is formed in a concave spherical shape. The edges 18 and 20 of lens 14 are formed at an angle such that ultrasonic energy transmitted therethrough from the crystal 10 will be reflected from the surface of a test specimen 22 back to the crystal 10.

The lens 14 is of a material such that the velocity of propagation of ultrasound therein is faster than in the couplant 24 whereby bending of the ultrasonic energy occurs as ultrasound is transmitted across the lens-couplant boundary. According to Snell's law $$\frac{\sin \theta_1}{\sin \theta_2} \text{ equals } \frac{V_1}{V_2}$$

where $\theta_1$ and $V_1$ are, respectively, the angle of incidence for the lens 14 and the velocity of propagation therethrough of ultrasonic energy from crystal 10 and $\theta_2$ and $V_2$ are, respectively, the angle of refraction and the velocity of propagation for the coupling medium 24. The velocities $V_1$ and $V_2$ are known and for a particular ultrasonic beam, $\theta_1$ and $\theta_2$ may be calculated to obtain the angle at which the edges 18 and 20 of lens 14 are formed.

The lens 14 as shown in FIG. 1 produces two ultrasonic beams simultaneously from ultrasound transmitted by crystal 10. The first, beam 26, is a conically shaped ultrasonic beam produced by the central portion 16 of the lens 14. The second, beam 28, is a doughnut-shaped ultrasonic beam produced by the edges 18 and 20 of the lens 14. The beam 26 is used for nondestructive inspection of the specimen 22 and the beam 28 is used for monitoring the crystal-to-specimen spacing. FIG. 2 shows a signal amplitude profile across the ultrasonic beams 26 and 28 of FIG. 1. The beam profile is taken at the focal point of the inspection beam 26 and shows the high energy of the inspection beam 26 and the broad low energy of the outer doughnut beam 28. By varying the size of the lens portion 16 with respect to the effective size of one of the edges 18 or 20 of the lens 14, the correct amount of energy in the doughnut beam 28 for specific testing conditions may be obtained.

The crystal 10 as shown in FIG. 1 is excited by a conventional pulse generator 30 whereby pulsed ultrasonic energy is generated therefrom into the lens 14. As previously described, lens 14 simultaneously generates two ultrasonic beams 26 and 28 which impinge on the surface of the specimen 22. The ultrasonic beam 28 travels a shorter distance to the specimen 22 than the ultrasonic beam 26. The beam 28 strikes the surface of the specimen 22 such that a portion thereof is reflected by the surface of the specimen 22. This reflected ultrasonic energy is detected by the crystal 10. The ultrasonic beam 26 has a portion thereof reflected by the surface of the specimen 22 and the remainder reflected by any defects within the specimen 22. Crystal 10 also detects the reflected signals from ultrasonic beam 26. Since ultrasonic beam 28 travels a shorter distance to the specimen than ultrasonic beam 26, the return echoes therefrom will be the first detected by crystal 10. The reflected signals from ultrasonic beam 28 are used as hereinafter described to remove the necessity of maintaining a constant crystal-to-specimen distance.

The signals detected by crystal 10 are transmitted to an amplifier 32 and thence to a surface echo gate 34 and a defect gate 36. The surface echo gate 34 and defect gate 36 are conventional electronic gates such as the type comprising a dual control grid tube which requires simultaneous inputs at both grids before an output is obtained therefrom. The pulse generator 30, when it excites crystal 10, also transmits a reference pulse to surface echo gate 34 via a conventional variable delay circuit 38. The delay circuit 38 is adjusted so that it delays the output from pulse generator 30 a time equal to the transit time from the crystal to the specimen 22 and return, whereby the reference pulse output from pulse generator 30 arrives at the surface echo gate 34 coincident in time with the return signal detected by crystal 10 from the doughnut beam 28. With coincidence in these two signals, the surface echo gate 34 transmits an output pulse to the defect gate 36 by a conventional variable delay circuit 40. The variable delay circuit 40 is adjusted so that the output from surface echo gate 34 is delayed a period of time greater than the time interval between the round trip transit time for the doughnut-shaped beam 28 to the specimen 22 and the round trip transit time of the conical beam 26 to the surface of specimen 22 and less than the time interval between the round trip transit time of the doughnut-shaped beam 28 to the specimen 22 and the round trip transit time of the conical beam 26 to defects within the specimen 22. This delay relationship may be clarified by reference to FIG. 3 wherein a typical pulse return is shown with respect to time for the device of FIG. 1. In FIG. 3 pulse 42 is the output pulse from pulse generator 30. Pulse 44 is the return detected pulse of doughnut-shaped beam 28 from the surface of the test specimen 22. Pulse 46 is the return detected pulse of conical beam 26 from the surface of the test specimen 22. Pulse 48 is the return detected pulse of conical beam 26 from a defect within specimen 22. The delay occasioned the output from surface echo gate 34 is such that it is greater than the time interval $T_2 - T_1$ but less than the time interval $T_3 - T_1$.

The output from surface echo gate 34 triggers defect gate 36 so that the return echo of conical beam 26 from subsurface flaws within specimen 22 is transmitted through the defect gate 36 to a recorder 50. Thus, the return echo from the doughnut beam 28 from the surface of test specimen 22 is used via surface echo gate 34 to accurately trigger a second gate, defect gate 36, immediately after spurious surface signals from surface reflections of the conical ultrasonic beam 26, whereby only signals are detected from subsurface flaws within the test specimen 22.

Reference is now made to FIG. 4 wherein is shown a detailed construction of the crystal-lens combination for the practice of the present invention with tubing as well as flat plate. The crystal 10 is mounted within a stainless steel case 52. Two electrodes 54 and 56 are attached to two sides of the crystal 10 for electrical coupling to the pulse generator 30. Backing material 58 is attached to the back side of the crystal 10 while electrical insulation 60 is disposed on the sides thereof adjacent the case 52. Epoxy lens 14 is mounted on the front side of the crystal 10. The edges 18 and 20 of lens 14 are machined such that they form an angle $\theta_3$ with respect to the front side of the crystal 10. This angle ($\theta_3$) is chosen so that ultrasonic energy will be transmitted to the surface of the specimen 22 and reflected therefrom back to the lens 14, as shown. The correct angle $\theta_3$ is determined as follows:

$\theta_3 = \theta_3'$ ($\theta_3'$ being the angle between a normal to an edge 18 or 20 of lens 14 and a normal to the front surface of lens 14).

$\theta_5$ = the effective angle of propagation of beam 28 with respect to the normal to an edge 18 or 20 of lens 14. $\theta_5$ may be approximated in the following manner. In operation, the focal point $f$ of the portion 16 of lens 14 is positioned such that a one-mil notch on the outside wall of specimen 22 will give the same received signal amplitude as a similar notch on the inside surface thereof. Further, the ultrasonic beam 26 is positioned so that it has an incident angle $\theta_6$ on the specimen 22 whereby circumferential propagation of shear waves at 45° between specimen wall boundaries is effected. Then, $$\tan \theta_5 = \frac{\text{opposite}}{\text{adjacent}} \cong \overline{pf} - \frac{\left(\frac{\overline{kb}}{2} + \overline{bd}\right)}{\overline{df} - \overline{mp} - \overline{de}}$$

where $\overline{pf}$ = the distance from the diameter of the specimen 22 to the focal point $f$ along a line drawn normal to the diameter and passing through the focal point $f$.

$\overline{mp}$ = the distance between focal point $f$ of beam 26 and a line which is parallel to the line $\overline{pf}$ and which is tangential to the surface of the specimen 22 adjacent the lens 14.

$\overline{kb}$ = the approximate width of the doughnut-shaped beam 28 at edge 18 or 20 of lens 14.

$\overline{bd}$ = the radius of the center portion 16 of lens 14.

$\overline{dc}$ = the depth of curvature of the center portion 16 of the lens 14.

With $\theta_5$ determined, one may calculate $\theta_3'$ using Snell's law which states that, $$\frac{\sin \theta_4}{\sin \theta_3'} = \frac{V_C}{V_L}$$

where $\theta_4$ = the angle of refraction of beam 28 with respect to the normal to the edge 18 or 20 of lens 14.

$V_C$ = the velocity of propagation of ultrasound in the couplant material.

$V_L$ = the velocity of propagation of ultrasound in the lens material.

$$\frac{\sin \theta_4}{\sin \theta_3'} = \frac{58.7 \text{ (velocity of propagation of ultrasound in water)}}{105 \text{ (velocity of propagation of ultrasound in an epoxy lens)}} = 5.59.$$

$$\theta_4 = \theta_3' - \theta_5$$

$$\frac{\sin (\theta_3' - \theta_5)}{\sin \theta_3'} = .559$$

$$\frac{\sin \theta_3' \cos \theta_5 - \cos \theta_3' \sin \theta_5}{\sin \theta_3'} = .559$$

$$\cos \theta_3' - \left[\frac{\cos \theta_3'}{\sin \theta_3'} (\sin \theta_5)\right] = .559$$

$$\cos \theta_5 - \cot \theta_3' \sin \theta_5 = .559$$

$$\cos \theta_5 - \frac{\sin \theta_5}{\tan \theta_3'} = .559$$

$$\tan \theta_3' = \frac{\sin \theta_5}{\cos \theta_5 - .559}$$

With $\theta_5$ determined as hereinbefore described, $\theta_3'$ and hence $\theta_3$ may thus be calculated for the apparatus of FIG. 4. For tubing 300 to 750 mils in diameter as well as flat plate, the following values for the lens-crystal combination of FIG. 4 were found to be acceptable.

$\overline{ab} = \overline{ac} = \overline{ac} = .25''$ = radius of curvature for the center portion 16 of lens 14.

$\overline{fb} = \overline{fc} = .528''$ = the focal point of the center section 16 of lens 14.

$\overline{bc} = 0.1875''$ = diameter of center portion 16 of lens 14.

$$\overline{bd} = \overline{dc} = \frac{\overline{bc}}{2} = 0.0937''.$$

$\overline{dc} = 0.0186''$ = the depth of curvature of the center portion 16 of lens 14.

$\overline{eh} = 0.01''$ = minimum thickness of the center portion 16 of lens 14.

$\overline{cg}=.0286''$=maximum thickness of the center portion 16 of lens 14.

$\overline{bk}\cong.0318''$=the approximate width of beam 28 at edge 18 or 20 of lens 14.

$\theta_1=22.03°$=the converging angle of the center portion 16 of lens 14 to the normal.

$\theta_2=10.2°$=the angle of convergence of beam 26 to the normal.

$\theta_5\cong5.3°$.

The value of $\theta_5$ was obtained using tubing having an inside radius of .2825'' and a wall thickness of .0175'', wherein the values of $\overline{pj}=.135''$ and $\overline{mp}=.070''$.

$$\theta_6=26.8''$$

calculated as follows:

$$\frac{\sin \theta_6}{\sin 45°}=\frac{V_C}{V_T}$$

where $V_T$=the shear wave velocity of ultrasound in the specimen 22.

$V_C$=the velocity of ultrasound in the couplant 24.

$\sin 45°$=the angle of refraction of beam 26 within the specimen 22 whereby the shear wave beam is propagated at an angle of 45° therewithin.

$\sin \theta_6=.707(\sin 45°)$ $$\times\frac{58.7 \text{ (velocity of ultrasound in water)}}{92 \text{ (velocity of ultrasound in Zr)}}$$

$\theta_6=26.8°$.

Diameter of crystal 10=.250''.

$\theta_3=\theta_3'=12°$ calculated as follows:

$$\tan \theta_3'=\frac{\sin \theta_5}{\cos \theta_5-.559}=\frac{.09237}{.9972-.559}=.212$$

$$\theta_3=12°$$

It is to be noted that the present invention works both for flat plates and for curved surfaces. When curved surfaces, such as the illustrated tube specimens 22, are used, the doughnut beam 28 has a shorter couplant path than the conical beam 26, since the conical beam 26 is directed at a point on the surface of the specimen 22 below that at which the doughnut-shaped beam is directed. When flat plate material is used, the doughnut beam has a shorter path through the difference in lens thickness for the two beams 26 and 28. Since the sound velocity in the lens material is much higher than in the couplant material 24, the sound propagating a greater portion of the distance in the lens will return first. Thus, for a flat surface specimen, the doughnut-shaped beam reflection will still return prior to any reflections from the conical beam 26 and may be used as hereinbefore described.

Persons skilled in the art will, of course, readily adapt the general teachings of the invention to embodiments far different than the embodiments illustrated. Accordingly, the scope of the protection afforded the invention should not be limited to the particular embodiment illustrated in the drawings and described above, but should be determined only in accordance with the appended claims.

The embodiments of the invention in which an exclusive property or privilege is claimed are defined as follows:

1. An ultrasonic device for nondestructively testing a specimen comprising means for generating an ultrasonic wave, means for generating from said ultrasonic wave a first ultrasonic beam focused on the surface of said specimen so that a portion thereof is reflected therefrom, means for simultaneously generating from said ultrasonic wave a second ultrasonic beam focused on the surface of said specimen to generate ultrasonic waves therein and having a longer transit time than said first ultrasonic beam, means for detecting reflections of said first and second ultrasonic beams from said specimen, and means responsive to detected surface reflections of said first ultrasonic beam from said specimen for measuring only detected subsurface reflections of said second ultrasonic beam from said specimen.

2. An ultrasonic device for nondestructively testing a specimen comprising means for generating an ultrasonic wave, a coupling medium disposed between said ultrasonic wave generating means and said specimen, lens means for simultaneously generating from said ultrasonic wave first and second ultrasonic beams focused via said coupling medium on the surface of said specimen to reflect therefrom a portion of said first beam and to generate therein ultrasonic waves from said second ultrasonic beam, said lens means generating said first ultrasonic beam to have a shorter transit time than said second ultrasonic beam, means for detecting reflections of said first and second ultrasonic beams from said specimen, and means responsive to detected surface reflections of said first ultrasonic beam from said specimen for measuring only detected subsurface reflections of said ultrasonic beam from said specimen.

3. An ultrasonic device for nondestructively testing a specimen comprising means for generating an ultrasonic wave, a coupling medium disposed between said wave generating means and said specimen, means for generating from said ultrasonic wave a doughnut-shaped ultrasonic beam focused on the surface of said specimen so that a portion thereof is reflected therefrom, means for simultaneously generating from said ultrasonic wave a conically shaped ultrasonic beam focused on the surface of said specimen to generate ultrasonic waves therein and having a longer transit time than said doughnut-shaped ultrasonic beam, means for detecting reflections of said ultrasonic beams from said specimen, and means responsive to detected surface reflections of said doughnut-shaped ultrasonic beam from said specimen for measuring only detected subsurface reflections of said conically shaped ultrasonic beam from said specimen.

4. The apparatus of claim 3 wherein said means for generating a conically shaped ultrasonic beam generate said conically shaped ultrasonic beam within said doughnut-shaped beam.

5. An ultrasonic device for nondestructively testing a specimen comprising means for generating a pulsed ultrasonic wave, a coupling medium disposed between said wave generating means and said specimen, a lens having a general shape of a conical frustum whose upper surface is spherically concave, means for coupling said lens to said wave generating means so that the conical sides and spherically concave upper surface thereof are in contact with said coupling medium, the conical sides of said lens reflecting said ultrasonic wave into a first ultrasonic beam which impinges on the surface of said specimen so that a portion thereof is reflected therefrom, said spherically concave upper surface of said lens refracting said ultrasonic wave into a second ultrasonic beam which impinges on the surface of said specimen to generate ultrasonic waves therein, means for detecting reflections of said first and second ultrasonic beams from said specimen, and means responsive to detected surface reflections of said first ultrasonic beam from said specimen for measuring only detected subsurface reflections of said second ultrasonic beam from said specimen.

6. An ultrasonic device for nondestructively testing a specimen comprising a crystal; means for exciting said crystal to generate a pulsed ultrasonic wave therefrom; a couplant material disposed between said crystal and said specimen; an epoxy lens having a general shape of a conical frustum whose upper surface is spherically concave; means for coupling said lens to said crystal so that the conical sides and spherically concave upper surface thereof are in contact with said coupling medium; the conical sides of said lens refracting said ultrasonic wave into a doughnut-shaped ultrasonic beam which impinges on the surface of said specimen so that a portion thereof is reflected therefrom and refracted back through the sides of said lens to be detected by said crystal; said spherically concave upper surface of said lens refracting said ultrasonic wave into a conically shaped ultrasonic beam which impinges on the surface of said specimen to generate ultrasonic waves therein, which waves are reflected by defects in said specimen and refracted by the spherically concave upper surface of said lens to be detected by said crystal; means for generating a reference signal coincident in time with said pulsed ultrasonic wave; means for delaying in time said reference signal a period equal to the crystal-to-specimen surface and return transit time of said doughnut-shaped ultrasonic beam; a first electrical gate circuit; means for connecting the detected output of said crystal to an input of said first gate circuit; means for connecting said delayed reference signal to the other input of said first gate circuit; said first gate circuit permitting passage therethrough of only the detected surface reflections from said specimen of said doughnut-shaped ultrasonic beam; means for delaying in time the output of said first gate circuit a period greater than the time interval between the crystal-to-specimen surface and return transit time of said doughnut-shaped beam and the crystal-to-specimen surface and return transit time of said conical ultrasonic beam and less than the time interval between the crystal-to-specimen surface and return transit time of said doughnut-shaped beam and the crystal-to-specimen defects and return transit time of said conical ultrasonic beam; a second electrical gate circuit, means for connecting the detected output of said crystal to an input of said second gate circuit; means for connecting the delayed output of said first gate circuit to the other input of said second gate circuit; said second gate circuit permitting the passage therethrough of only detected reflected signals from defects within said specimen; and means for recording the output of said second electrical gate circuit.

7. The apparatus according to claim 6 wherein said crystal has a diameter of approximately .25 inch; said lens is centered with respect to said crystal; the conical sides of said lens have an angle of slope with respect to the base thereof of approximately 12 degrees; and the spherically concave upper portion of said lens has a diameter of .1875 inch, a radius of curvature of .25 inch and a focal point of .528 inch.

References Cited
UNITED STATES PATENTS

| | | | |
|---|---|---|---|
| 3,233,450 | 2/1966 | Fry | 73—67.8 |
| 3,309,913 | 3/1967 | Weighart | 73—67.8 |

FOREIGN PATENTS

| | | |
|---|---|---|
| 766,984 | 1/1957 | Great Britain. |
| 371,908 | 9/1963 | Switzerland. |

RICHARD C. QUEISSER, *Primary Examiner.*

J. R. FLANAGAN, *Assistant Examiner.*